3,594,478
PHARMACEUTICAL COMPOSITIONS CONTAINING BENZOTHIOPHENE DERIVATIVES
Arne Elof Brandstrom, Goteborg, and Stig Ake Ingemar Carlsson, Molnlycke, Sweden, assignors to Aktiebolaget Hassle, Goteborg, Sweden
No Drawing. Division and Continuation-in-part of application Ser. No. 553,016, May 31, 1966. This application Nov. 24, 1969, Ser. No. 879,516
Claims priority, application Sweden, June 1, 1965, 7,128/65
Int. Cl. A61u 27/00
U.S. Cl. 424—248   16 Claims

ABSTRACT OF THE DISCLOSURE

Benzothiophene derivatives having the structural formula described below, a method for their preparation and pharmaceutical preparations containing them. These preparations are useful as analgesic, antipyretic, antiinflammatory, antitussive agents, as local anaesthetics and antispasmodic and antihistaminic agents. They have these properties combined with relatively low toxicity. They may, therefore, be used for the relief of pain, inflammation, pyresis of various origins, or tussive irritation.

---

This application is in part a division and in part a continuation-in-part of our copending application Ser. No. 553,616 filed May 31, 1966, now abandoned.

The present invention relates to benzothiophene derivatives and is concerned with a new class of compounds having valuable pharmacological properties, their production and pharmaceutical preparations containing them.

In one aspect, the invention comprises benzothiophene derivatives represented by the general formula:

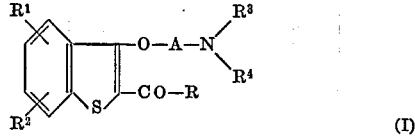

(I)

(wherein R represents a lower alkyl group or an unsubstituted or substituted phenyl group in which any substituent is a lower alkyl, lower alkoxy, dioxy-lower alkylene or trifluoromethyl group or a fluorine, chlorine or bromine atom, $R^1$ represents a hydrogen, fluorine, chlorine or bromine atom or a lower alkyl or lower alkoxy group, $R^2$ represents a hydrogen, fluorine, chlorine or bromine atom or a lower alkyl or lower alkoxy group or, provided $R^1$ is a hydrogen atom, a nitro, amino, hydroxy, lower acyloxy, lower dialkylamino or lower acylamino group, A represents an alkylene group containing not more than four carbon atoms, $R^3$ represents a hydrogen atom or a lower alkyl group, $R^4$ represents a lower alkyl or benzyl group, or

represents a pyrrolidino, piperidino, hexamethyleneimino, morpholino, lower dialkylmorpholino, piperazino, lower alkylpiperazino, N-benzylpiperazino or tetrahydropyridino group) in the form of the free base or of a pharmaceutically acceptable salt thereof.

Illustrative meanings for the various groups shown in the aforesaid formula are as follows:

A: $-CH_2-CH_2-$, $CH_2-CH_2-CH_2-$, $-CH(CH_3)-CH_2-$ or $-CH(CH_3)-CH(CH_3)-$;

R: methyl, ethyl, n-propyl, iso-propyl, n-butyl, iso-butyl, n-amyl, phenyl, o-tolyl, m-tolyl, p-tolyl, 2,4-dimethylphenyl, 2-chloro-4-methylphenyl, o-methoxyphenyl, m-methoxyphenyl, p-methoxyphenyl, o-ethoxyphenyl, m-ethoxyphenyl, p-ethoxyphenyl, 3,4 - methylenedioxyphenyl, p-n-propoxyphenyl, p-isopropoxyphenyl, p-n-butoxyphenyl, o-chlorophenyl, m-chlorophenyl, p-chlorophenyl, o-bromophenyl, m-bromophenyl, p-bromophenyl, o-fluorophenyl, m-fluorophenyl, p-fluorophenyl, o-trifluoromethylphenyl, m-trifluoromethylphenyl or p-trifluoromethylphenyl;

$R^1$ and $R^2$: hydrogen, methyl, ethyl, n-propyl, iso-propyl, n-butyl, iso-butyl, n-amyl, methoxy, ethoxy, n-propoxy, iso-propoxy, n-butoxy, fluorine, chlorine, bromine, and when $R^1$ is hydrogen, $R^2$ may additionally represent nitro, amino, hydroxy, acetoxy, propionoxy, dimethylamino, diethylamino, di-n-propylamino, formylamino, acetylamino, propionylamino, butyrylamino or iso-butyryl amino;

$R^3$: hydrogen, methyl, ethyl, n-propyl, iso-propyl, n-butyl, iso-butyl or n-amyl;

$R^4$: methyl, ethyl, n-propyl, iso-propyl, n-butyl, iso-butyl, n-amyl or benzyl;

$-NR^3R^4$: pyrrolidino, piperidino, hexamethyleneimino, morpholino, 2,6-dimethylmorpholino, piperazino, N-methylpiperazino, N-ethylpiperazino, N-benzylpiperazino or tetrahydropyridino.

Benzothiophene derivatives according to the invention have been shown to possess valuable pharmacological properties, more particularly antitussive properties and may contain one or more of the properties analgesic, antipyretic, antiinflammatory, local anaesthetic, antispasmodic and antihistaminic activity, in each case combined with relatively low toxicity. They may, therefore be used for the relief of tussive irritation and one or more of the symptoms, pain, inflammation, and pyresis of various origins.

In clinical practice the benzothiophene derivatives of the invention will normally be administered orally, rectally or by injection in the form of pharmaceutical preparations comprising the active ingredient in the form of the free base or one of the common pharmaceutically acceptable salts, e.g. the hydrochloride, in association with a pharmaceutically acceptable carrier which may be a solid, semi-solid or liquid diluent or an ingestible capsule and such preparations comprise a further aspect of the invention. Usually the active substance will comprise between 0.1 and 95% by weight of the preparation, for example, between 0.5 and 20% for preparations intended for injection and between 0.1 and 50% for preparations intended for oral administration.

To produce pharmaceutical preparations in the form of dosage units for oral application containing a compound of the invention in the form of the free base, or a pharmaceutically acceptable salt thereof, the active ingredient may be mixed with a solid, pulverulent carrier, for example lactose, saccharose, sorbitol, mannite, a starch such as potato starch, corn starch, amylopectin, laminaria powder or citrus pulp powder, a cellulose derivative or gelatine, and also may include lubricants such as magnesium or calcium stearate or a carbowax or other polyethylene glycol wax and compressed to form tablets or centres for dragees. If dragees are required, the centres may be coated, for example with concentrated sugar solutions which may contain gum arabic, talc and/or titanium dioxide, or alternatively with a lacquer dissolved in easily volatile organic solvents or mixtures of organic solvents. Dyestuffs can be added to these coatings, for example, to distinguish between different contents of active substance. For the preparation of soft gelatin capsules (pearl-shaped closed capsules) consisting of gelatin and, for example, glycerin, or similar closed capsules, the active substance may be admixed with Carbowax. Hard gelatin capsules may contain granulates of the active substance with solid, pulverulent carriers such as lactose, saccharose, sorbitol, mannite, starches (for example potato starch, corn starch or amylopectin), cellulose derivatives or gelatin, and may also include magnesium stearate or stearic acid. Dosage units for rectal application may be in the form of suppositories comprising the active substance in admixture with a neutral fatty base, or gelatin rectal capsules comprising the active substance in admixture with a Carbowax or other polyethylene glycol wax.

Liquid preparations for oral application may be in the form of syrups or suspensions, for example solutions containing from about 0.1% to 20% by weight of active substance, sugar and a mixture of ethanol, water, glycerine, propyleneglycol and, optionally, aroma, saccharin and/or carboxymethylcellulose as a dispersing agent.

For parenteral application by injection preparations may comprise an aqueous solution of a water soluble pharmaceutically acceptable salt of the active substance desirably in a concentration of 0.5–10%, and optionally also a stabilising agent and/or buffer substance in aqueous solution. Dosage units of the solution may advantageously be enclosed in ampoules.

Benzothiophene derivatives of the aforesaid Formula I may be produced according to a further aspect of the invention, by condensing a compound of the formula:

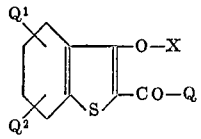

II with a compound of the formula:

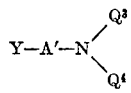

III (wherein $A^1$, Q and $Q^1$ have the same meaning as A, R and $R^1$ respectively, $Q^2$ represents a hydrogen, fluorine, chlorine or bromine atom or a lower alkyl or lower alkoxy group or provided $Q^1$ represents a hydrogen atom, a nitro, lower acyloxy, lower dialkylamino or lower acylamino group or a hydroxy or amino group substituted by a protecting group replaceable by hydrogen by hydrolysis or hydrogenation, $Q^3$ represents a lower alkyl group or a protecting group replaceable by hydrogen by hydrolysis or hydrogenation, $Q^4$ represents a lower alkyl or benzyl group or $NQ^3Q^4$ represents a pyrrolidino, piperidino, hexamethyleneimino, morpholino, tetrahydropyridino or lower dialkylmorpholino group or a piperazino, lower alkyl piperazino or benzyl piperazino group in which the nitrogen atom in the 4-position is substituted by a lower alkyl or benzyl group or by a protecting group replaceable by hydrogen by hydrolysis or hydrogenation, and X and Y represent atoms or groups reactable together to form an ether linkage between the benzothiophene moiety and the group A1) and, where a benzothiophene derivative which contains a hydroxyl group or a primary or secondary amino group is desired, replacing the protecting group or groups by hydrolysis or hydrogenation. Where the benzothiophene derivative is required in the form of a pharmaceutically acceptable salt the process may include the step of converting the product of the condensation step before or after removal of any protecting steps present into the desired salt. Where in the desired product $R^2$ represents an acyloxy or acylamino group, there may first be formed the corresponding hydroxy or amino compound which is then acylated to give the desired product. Where in the desired product $R^2$ represents an amino group, there may first be produced the corresponding nitro compound which is then hydrogenated.

In the compounds of Formulae II and III X may, for example represent hydrogen, sodium, potassium, rubidium or trialkylammonium, and Y may, for example represent halogen, such as chlorine or bromine or a functionally equivalent group such as benzenesulphonyl or toluylsulphonyl.

Starting materials of the general formula:

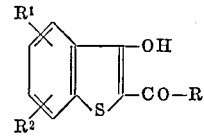

IV where R, $R^1$ and $R^2$ have the same significance as stated above, may be prepared by several different methods, as illustrated by the following reaction schemes:

Method A

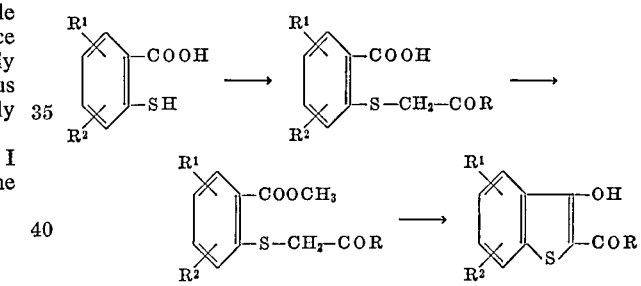

Method B

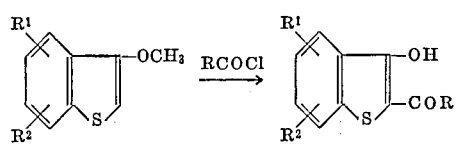

Method C

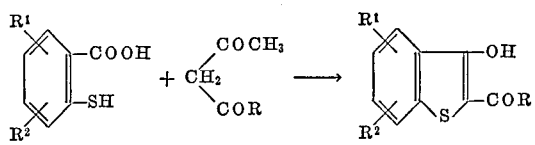

Illustrative procedures for carrying out Methods A, B and C follow.

The thiosalicylic acids used as starting materials for the first stage of Method A were generally prepared by the standard method described for the preparation of thiosalicylic acid in the Organic Syntheses col. vol. II, 580.

ω-[2-carboxythioaryloxy]-acetophenones have been synthesised by the following procedure for carrying out the first stage of Method A:

A mixture of 15 g. of 2-mercapto-5-methylbenzoic acid, 26 g. of potassium carbonate, 22.6 g. of ω-bromo-p-ethoxyacetophenone and 260 ml. of acetone was stirred and refluxed overnight. Water was added until a clear solution was obtained, any undissolved material being extracted with ether. The mixture was acidified and the product collected by filtration. After recrystallisation from alcohol 18.9 g. of ω-[4'-methyl-2'-carboxythiophenoxy]-4-ethoxyacetophene (M.P. 153° C.) were obtained.

The following ω-[2-carboxythioaryloxy]-acetophenones have been prepared in an analogous way:

R¹―☐―COOH
   ☐―S―CH₂―CO―☐―R⁰
R²

| R⁰ | R¹ | R² | M.P., °C. |
|---|---|---|---|
| 4-C(CH₃)₃ | H | H | 190 |
| 4-F | H | H | 166 |
| 4-Cl | H | H | 166 |
| 4-OCH₃ | H | H | 180 |
| 4-OC₂H₅ | H | H | 166 |
| H | 5-CH₃ | H | 174 |
|  | 6-CH₃ | H | 190 |
|  | 4-CH₃ | 5-CH₃ | 160 |
| 4-OC₂H₅ | 4-Cl | H | 163 |
|  | 6-Cl | H | 140 |
|  | 4-OCH₃ | H | 154 |

ω-[2-carbomethoxythioaryloxy] - acetophenones have been synthesised by the following procedure for carrying out the second stage of Method A:

To an ice-cold solution of 5.6 g. of diazomethane in 250 ml. of ether, 29.4 g. of ω-[4'-methyl-2'-carboxythiophenoxy]-4-ethoxyacetophenone are added in portions. After addition was completed, the mixture was allowed to warm to room temperature for 2 hours. The ether was then evaporated and the residue recrystallized from methanol. 31.2 g. of ω-[4'-methyl-2'-carboxymethoxythiophenoxy]-4-ethoxyacetophenone (M.P. 90° C.) were obtained.

The following ω-[2-carbomethoxythioaryloxy]-acetophenones have been prepared in an analogous way.

R¹―☐―COOCH₃
   ☐―S―CH₂―CO―☐―R⁰
R²

| R⁰ | R¹ | R² | M.P., °C. |
|---|---|---|---|
| 4-C(CH₃)₃ | H | H | 58 |
| 4-F | H | H | 114 |
| 4-Cl | H | H | 130 |
| 4-OCH₃ | H | H | 136 |
| 4-OC₂H₅ | H | H | 108 |
| H | 5-CH₃ | H | 105 |
|  | 6-CH₃ | H | 108 |
|  | 4-CH₃ | 5-CH₃ | 107 |
| 4-OC₂H₅ | 4-Cl | H | 102 |
|  | 6-Cl | H | 66 |
|  | 4-OCH₃ | H | 120 |

2-aroyl-3-hydroxybenzothiophenes have been synthesised by the following procedure for carrying out the third stage of Method A:

2.5 g. of sodium were dissolved in 200 ml. of absolute alcohol. 31 g. of ω-[4'-methyl-2'-carbomethoxythiophenoxy]-4-ethoxyacetophenone were added in portions. The mixture was stirred and refluxed for 2 hours and then poured into ice water. After acidification with hydrochloric acid, the product was collected by filtration, washed with water and recrystallized from a mixture of methylethylketone and alcohol. 25.5 g. of a bright yellow compound (M.P. 140° C.) were obtained.

The following 2-aroyl-3-hydroxy-benzothiophenes have been prepared in an analogous way.

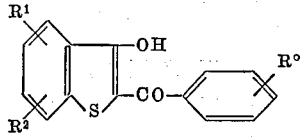

| R⁰ | R¹ | R² | M.p., °C. |
|---|---|---|---|
| 4'-C(CH₃)₃ | H | H | 93 |
| 4'-F | H | H | 115 |
| 4'-Cl | H | H | 150 |
| 4'-OCH₃ | H | H | 112 |
| 4'-OC₂H₅ | H | H | 140 |
| H | 6-CH₃ | H | 105 |
|  | 5-CH₃ | 6-CH₃ | 177 |
| 4'-OC₂H₅ | 5-Cl | H | 154 |
| 4'-OC₂H₅ | 5-Cl | H | 154 |
| 4'-OC₂H₅ | 7-Cl | H | 134 |
|  | 5-OCH₃ | H | 150 |

3-methoxybenzothiophenes used as starting materials in Method B may be prepared from the corresponding 3-hydroxy benzothiophene by methylation with dimethylsulphate.

2-aroyl-3-hydroxy-benzothiophenes have been synthesised by the following procedure for carrying out Method B:

In a 500 ml. three-necked round bottomed flask fitted with a stirrer, a reflux condenser and a stopper, 30 g. of 3-methoxybenzothiophene and 35 g. of p-ethoxybenzylchloride were dissolved in 200 ml. of carbon disulphide. This solution was cooled in an icebath and 30 g. of anhydrous aluminum chloride were added in portions. After addition was complete, the mixture was refluxed for 3 hours on a water bath. The solvent was then distilled off and the residue treated with ice and 100 ml. of 5 N hydrochloric acid. The mixture was extracted with ether, the ether layer washed with water, dried with sodium sulphate and evaporated. After recrystallization from methyl ethyl ketone 25.2 g. of 2-(p-ethoxybenzoyl)-3-hydroxybenzothiophene M.P. 139° C. were obtained.

The following 2-aroyl-3-hydroxy benzothiophenes have been prepared in an analogous way.

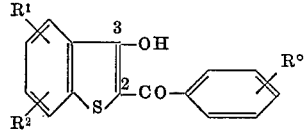

| R⁰ | R¹ | R² | M. P. °C. |
|---|---|---|---|
| H | H | H | 119 |
| 4'-F | H | H | 116 |
| 4'-Cl | H | H | 170 |

2-benzoyl-3-hydroxybenzothiophene has been synthesised by the following procedure for carrying out Method C.

20 g. of thiosalicylic acid was added to 200 ml. of concentrated sulphuric acid. To this mixture 24 g. of benzoylacetone was added in portions. The mixture was heated to 50 °C. for 1 hour. It was then poured into ice. The product was collected by filtration and washed with water. After recrystallization from alcohol, 19 g. of 2-benzoyl-3-hydroxybenzothiophene (M.P. 116° C.) were obtained.

The present invention is illustrated by the following examples.

EXAMPLE 1

A mixture of 12 g. of 2-benzoyl-3-hydroxybenzothiophene, 120 ml. of acetone, 19.5 g. of potassium carbonate and 7.5 g. of 2-dimethylaminoethylchloride hydrochloride was refluxed with stirring for 24 hours. The mixture was filtered and the acetone and volatile impurities removed by distillation under reduced pressure on a boiling water bath. The residue was dissolved in ether and the hydrochloride precipitated by the addition of a solution of hydrogen chloride in ether. The product was collected by filtration and recrystallized from ethyl acetate. In this way 4.7 g. of 2-benzoyl-3-NN dimethylaminoethoxy benzothiophene hydrochloride (M.P. 138° C.) was obtained.

EXAMPLE 2

A mixture of 8 g. of 2-(p-ethoxybenzoyl)-3-hydroxy-5-methylbenzothiophene, 200 ml. of acetone, 10.6 g. of potassium carbonate and 4.8 g. of pyrrolidinoethylchloride hydrochloride was refluxed for 24 hours. The product was isolated in the same way as described in Example I. After recrystallization from acetone, 7.0 g. of 2-(p-ethoxybenzoyl) - 3 - pyrrolidinoethoxy-5-methylbenzothiophene hydrochloride (M.P. 169° C.) was obtained.

EXAMPLE 3

A mixture of 11 g. of 2-(p-tert-butylbenzoyl)-3-hydroxybenzothiophene, 110 ml. of dioxane, 14.5 g. of potassium carbonate and 6.63 g. of pyrrolidinoethylchloride hydrochloride was refluxed for 24 hours. The product was isolated in the same way as described in Example 1. After recrystallization from acetone 7.7 g. of 2-(p-tert-butylbenzoyl)-3-pyrrolidinoethoxy benzothiophene hydrochloride (M.P. 162° C.) was obtained.

EXAMPLE 4

In a 500 ml. flask with a stirrer and reflux condenser 8.4 g. of p-toluenesulphonyl chloride, 200 ml. of acetone and 5.1 g. of pyrrolidinoethanol were mixed. The mixture was refluxed for 10 minutes and cooled. 12.5 g. of 2-p-ethoxybenzoyl)-3-hydroxy-5-methylbenzothiophene and 16.6 g. of potassium carbonate were added and the mixture refluxed overnight. The mixture was then cooled and filtered and the acetone solution was evaporated. The residue was extracted with boiling ether, the ether solution was evaporated and the residue dissolved in 200 ml. of acetone. This solution was acidified with hydrogen chloride in acetone and filtered hot. The solution was concentrated to a small volume, which on cooling deposited 2 - (p-ethoxybenzoyl)-3-pyrrolidinoethoxy - 5-methylbenzothiophene hydrochloride (M.P. 169° C.).

EXAMPLE 5

A mixture of 9 g. of 2-p-ethoxybenzoyl)-3-hydroxy-5-methylbenzothiophene, 200 ml. of acetone and 10.8 g. of 2-pyrrolidinoethyl chloride were refluxed over night. 10 g. of potassium carbonate was then added and the mixture stirred under reflux for some minutes. The product was then isolated in exactly the same way as described in Example 2. The product, 2-(p-ethoxybenzoyl)-3-pyrrolidinoethoxy-5-methylbenzothiophene hydrochloride, after several recrystallizations from acetone, had a melting point of 169° C.

EXAMPLE 6

A mixture of 12 g. of 2-benzoyl-3-hydroxybenzothiophene, 120 ml. of triethylamine and 7.5 g. of dimethylaminoethylchloride hydrochloride was refluxed over night. 20 g. of potassium carbonate was then added. The mixture was filtered and the residue treated as described in Example 1. After several recrystallizations from ethyl acetate, 2 - benzoyl - 3-NN-dimethylaminoethoxybenzothiophene (M.P. 138° C.) was obtained.

EXAMPLE 7

1.0 g. of sodium hydride (50%) was dissolved in 150 ml. of dimethysulphoxide. 12.5 g. of 2-(p-ethoxybenzoyl)-3-hydroxybenzothiophene and 6.5 g. of 2-pyrrolidinoethylchloride were added. The mixture was stirred on a boiling water bath for 3 hours, cooled and filtered. The solvent was distilled off under reduced pressure and the residue dissolved in ether. The hydrochloride was precipitated by the addition of hydrogen chloride in ether and the product recrystallized from acetone. 5 g. of 2-(p-ethoxybenzoyl) - 3 - pyrrolidinoethoxybenzothiophene hydrochloride (M.P. 137–140° C.) was obtained.

EXAMPLE 8

Example 2 was repeated with the potassium carbonate replaced by an equivalent amount of rubidium carbonate. In this way 7.2 g. of 2-(p-ethoxybenzoyl)-3-pyrrolidinoethoxy - 5 - methyl benzothiophene hydrochloride (M.P. 169° C.) was obtained.

EXAMPLE 9

A mixture of 12 g. of 2-benzoyl-3-hydroxybenzothiophene, 120 ml. of acetone, 19.5 g. of potassium carbonate and 11.5 g. of β-diethylaminoethylbromide hydrobromide was refluxed over night. After working up in the manner described in Example 1, 8.6 g. of 2-benzoyl-3-NN diethylaminoethoxybenzothiophene hydrochloride (M.P. 107° C.) were obtained.

EXAMPLE 10

Example 2 was repeated with the acetone replaced by an equal volume of dimethylformamide. 6 g. of 2-(p-ethoxybenzoyl)-3-pyrrolidinoethoxy - 5 - methyl benzothiophene hydrochloride (M.P. 169° C.) were obtained.

The following compounds have been prepared in an analogous way:

| Example | A | R | $R^1$ | $R^2$ | $-N\begin{array}{c}R^3\\R^4\end{array}$ | Equivalent weight Found | Equivalent weight Calculated | M.P., °C. |
|---|---|---|---|---|---|---|---|---|
| 11 | $CH_2 \cdot CH_2-$ | 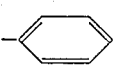 | H | H | $-N\begin{array}{c}CH_3\\CH_3\end{array}$ | 354 | 361 | 135 |
| 12 | Same as above | Same as above | H | H | $-N\begin{array}{c}C_2H_5\\C_2H_5\end{array}$ | 388 | 390 | 112 |
| 13 | do | 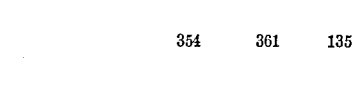—$C(CH_3)_3$ | H | H | $-N\begin{array}{c}CH_2 \cdot CH_2\\CH_2 \cdot CH_2\end{array}$ | 442 | 444 | 162 |
| 14 | do | —F | H | H | $-N\begin{array}{c}C_2H_5\\C_2H_5\end{array}$ | 406 | 408 | 159 |
| 15 | do | Same as above | H | H | $-N\begin{array}{c}CH_2 \cdot CH_2\\CH_2 \cdot CH_2\end{array}$ | 407 | 406 | 177 |

TABLE—Continued

| Example | A | R | R¹ | R² | $-N\begin{smallmatrix}R^3\\R^4\end{smallmatrix}$ | Equivalent weight Found | Equivalent weight Calculated | M.P., °C. |
|---|---|---|---|---|---|---|---|---|
| 16 | do | —C₆H₄—Cl | H | H | —N(C₂H₅)₂ | 420 | 424 | 187 |
| 17 | do | Same as above | H | H | —N(CH₂·CH₂)(CH₂·CH₂) (pyrrolidino) | 426 | 422 | 196 |
| 18 | —CH₂·CH₂ | do | H | H | —N(CH·CH=CH)(CH₂·CH₂) | 435 | 434 | 215 |
| 19 | —CH₂·CH₂— | do | H | H | —N(CH₂·CH₂·CH₂)(CH₂·CH₂·CH₂) | 447 | 450 | 144 |
| 20 | Same as above | —C₆H₄—OCH₃ | H | H | —N(C₂H₅)₂ | 418 | 420 | 130 |
| 21 | do | Same as above | H | H | —N(CH₂·CH₂)(CH₂·CH₂) | 414 | 418 | 177 |
| 22 | do | do | H | H | —N(CH₂·CH=CH)(CH₂·CH₂) | 430 | 430 | 190 |
| 23 | do | do | H | H | —N(CH₂·CH₂·CH₂)(CH₂·CH₂·CH₂) | 441 | 446 | 128 |
| 24 | do | —C₆H₄—OC₂H₅ | H | H | —N(C₂H₅)₂ | 430 | 434 | 150 |
| 25 | do | Same as above | H | H | —N(CH₂·CH₂)(CH₂·CH₂) | 432 | 432 | 140 |
| 26 | do | do | H | H | —N(CH₂·CH₂)(CH₂)(CH₂·CH₂) (piperidino) | 440 | 446 | 180 |
| 27 | do | do | H | H | —N(CH₂·CH₂)O(CH₂·CH₂) (morpholino) | 448 | 448 | 165 |
| 28 | do | do | 5-CH₃ | H | —N(C₂H₅)₂ | 452 | 448 | 187 |
| 29 | do | do | Same | H | —N(CH₂·CH₂)(CH₂·CH₂) | 448 | 446 | 169 |
| 30 | do | do | do | H | —N(CH₂·CH₂)(CH₂)(CH₂·CH₂) | 465 | 460 | 157 |
| 31 | do | —C₆H₅ | H | 6-CH₃ | —N(CH₂CH₂)(CH₂·CH₂) | 401 | 402 | 166 |
| 32 | do | —C₆H₄—OC₂H₅ | 5-CH₃ | Same | —N(CH₂·CH₂)(CH₂·CH₂) | 471 | 460 | 104 |

TABLE—Continued

| Example | A | R | R¹ | R² | $-N\begin{smallmatrix}R^3\\R^4\end{smallmatrix}$ | Equiv. wt. Found | Equiv. wt. Calculated | M.P., °C |
|---|---|---|---|---|---|---|---|---|
| 33 | do | Same as above | 5-Cl | H | Same as above | 459 | 466 | 149 |
| 34 | do | do | 7-Cl | H | $-N(CH_2CH_2)_2CH_2$ (piperidino) | 482 | 480 | 180 |
| 35 | $-CH_2CH_2-$ | do | 5-OCH₃ | H | piperidino | 469 | 462 | 93 |
| 36 | $-CH_2\cdot CH_2-$ | do | Same | H | morpholino | 485 | 478 | 121 |
| 37 | $-CH_2-CH_2-$ | $-CH_3$ | H | H | morpholino | 343 | 342 | 170 |
| 38 | Same as above | $-C-(CH_3)_3$ | H | H | pyrrolidino | 364 | 363 | 166 |
| 39 | do | $-C_6H_4-CH_3$ | 5-Br | H | Same as above | 433 | 431 | 174 |
| 40 | do | $-C_6H_4-OC_2H_5$ | Same | H | do | 511 | 511 | 169 |
| 41 | $-CH_2-CH_2-CH_2$ | Same as above | do | H | $-N(C_2H_5)_2$ | 529 | 527 | 136 |
| 42 | $-CH_2-CH_2-$ | do | do | H | 2,6-dimethylmorpholino | 560 | 555 | 170 |

EXAMPLE 43

An antitussive syrup containing 0.5% (weight per volume) of active substance was produced from the following ingredients:

|  | G. |
|---|---|
| 2 - (p - ethoxybenzoyl) - 3 - (β-morpholinoethoxy)-benzothiophene | 0.5 |
| Saccharin | 0.6 |
| Sugar | 3.0 |
| Glycerin | 5.0 |
| Distilled water | 10.0 |
| Aroma | 0.1 |

Ethanol 96% to 100.0 ml.

The sugar and saccharin were dissolved in hot distilled water. On cooling, the solution was made up to weight with water and the glycerin was added. The aqueous solution was poured into a solution of the active substance and aroma in about 65 ml. of ethanol and then made up to 100 ml. with ethanol.

The active substance may be replaced with one of its pharmaceutically acceptable acid addition salts.

EXAMPLE 44

250 g. of (p-ethoxybenzoyl)-3-β-pyrrolidinoethoxy)-5,6-dimethylbenzothiophene were mixed with 175.80 g. of lactone and 169.70 g. of potato starch, the mixture was moistened with an alcoholic solution of 10 g. of stearic acid and granulated through a sieve. After drying, 160 g. of potato starch, 200 g. of talc, 2.50 g. of magnesium stearate and 32 g. of colloidal silicon dioxide were mixed in and the mixture was pressed into tablets (10,000) each weighing 100 mg. and containing 25 mg. of active substance which are suitable for use as analgesic tablets. The tablets can be marked with break lines to enable a dose other than 25 mg. or a multiple thereof to be administered.

Antitussive tablets may be prepared by replacing the above active substance by 2-(p-ethoxybenzoyl)-3-(β-pyrrolidinoethoxy)-5-methoxybenzothiophene.

EXAMPLE 45

A granulate was prepared from 250 g. of 2-(p-ethoxybenzoyl) - 3 - (β-pyrrolidinoethoxy)-5,6-dimethylbenzothiophene, 175.90 g. of lactose and an alcoholic solution of 10 g. of stearic acid. After drying, the granulate was mixed with 56.60 g. of colloidal silica, 165 g. of talc, 20 g. of potato starch and 2.50 g. of magnesium stearate and pressed into dragee centers (10,000). These were first coated with 6 g. of shellac, then with a concentrated syrup containing 502.28 g. of crystallized saccharose, 10 g. of gum arabic, 0.22 g. of dyestuff and 1.5 g. of titanium dioxide, and dried. Analgesic dragees weighing 120 mg. and containing 25 mg. of active substance were obtained.

When 2 - (p - ethoxybenzoyl)-3-(β-morpholinoethoxy)-benzothiophene was used as active substance, antitussive dragees were obtained.

EXAMPLE 46

1.0 g. of 2-(p-ethoxybenzoyl)-3-(β-pyrrolidinoethoxy)-5-methylbenzothiophene and 0.10 g. of ascorbic acid, were dissolved in distilled water to make 100 ml. This solution, each ml. of which corresponds to a content of 10 mg. of active substance, was used to fill ampoules which were sterilized by heating in the usual way.

Analgetic effect

The analgetic effect was estimated by stimulation of the tail in mice by light and heat by the method of Gross, Helv. Physiolog. Acta 5 C 31 (1947) with the apparatus of Friebel and Reichle, Arch. Exp. Path. u. Pharmakol. 226, 551 (1955). The reaction time before and after the administration of the test substance was measured. The dose which gives a 50% increase in reaction time 60 minutes after the administration ($ED_{50}$) is given. The analgetic effect of the compounds is reported in the following way.

| $ED_{50}$ p.o. mg./kg. bodyweight: | Analgetic effect |
|---|---|
| <50 | ++++ |
| 50–100 | +++ |
| 100–200 | ++ |
| 200–400 | + |

As a comparison the analgetic effect of codeine phosphate and d-propoxyphene hydrochloride was estimated using the same method. All compounds were given orally.

Antitussive effect

The antitussive effect was investigated by estimation of the dose of the test substance which upon intravenous injection revoked electrically induced attacks of coughing in anaesthetized cat by the method described by Domenjoz, Arch. fur exper. Pathologie u. Pharmakologie 215, 19–24 (1952). The dose which gives a cough inhibiting effect in at least 50% of the experiments ($ED_{50}$) is given. The effect is reported in the following way:

| $ED_{50}$ mg./kg. bodyweight ($a$); | Antitussive effect |
|---|---|
| $a<2$ | +++ |
| $a=2-3$ | ++ |
| $3<a\leq5$ | + |

As a comparison the effect of codein phosphate was estimated using the same method.

Spasmolytic effect

The spasmolytic effect was estimated in classical way by measuring the reversion of $BaCl_2$=induced spasm in the isolated small intestine of the guinea pig. A comparison with the spasmolytic effect of papaverine and diphenhydramine=HCl was carried out and the effect of the test substance is recorded in parts of the effect of papaverine resp. diphenhydramine=HCl.

Toxicity

The substance to be tested was administered intraperitoneally or orally to 3–4 groups of 10 albino mice. The animals were observed for 24 hours. The number of mice which were killed by the substance at each dose was recorded and expressed in percent of the number of animals injected at this dose. The dose of the test substance which killed 50% of the animals ($LD_{50}$) was estimated from a logarithmic dose response curve based on 3 to 4 doses. The results are given in Table II.

The result of the pharmacological test are indicated in Tables I and II. A, R, $R^1$, $R^2$ and $—NR^3R^4$ have the specified significance.

TABLE I.—ANALGETIC AND ANTITUSSIVE EFFECT

| Code Number: | A | R | $R^1$ | $R^2$ | $—NR^3R^4$ | Analgetic effect, p.o. | Antitussive effect, i.v. |
|---|---|---|---|---|---|---|---|
| 43/59 | —CH₂—CH₂— | —C(CH₃)₃ | H | H | —N(pyrrolidine) | ++ | ++ |
| 57/16 | Same as above | —C₆H₅ | H | H | —N(CH₃)₂ | | ++ |
| 57/14 | do | Same as above | H | H | —N(C₂H₅)₂ | | ++ |
| 57/58 | do | —C₆H₄—C(CH₃)₃ | H | H | —N(pyrrolidine) | | + |
| 57/21 | do | —C₆H₄—F | H | H | —N(C₂H₅)₂ | | ++ |
| 43/49 | —CH—CH₂— | Same as above | H | H | —N(pyrrolidine) | | ++ |
| 43/25 | —CH₂—CH₂— | —C₆H₄—Cl | H | H | —N(C₂H₅)₂ | | ++ |
| 43/26 | Same as above | Same as above | H | H | —N(pyrrolidine) | | + |
| 43/28 | do | do | H | H | —N(piperidine) | | ++ |
| 41/99 | do | —C₆H₄—OCH₃ | H | H | —N(C₂H₅)₂ | ++ | ++ |
| 43/22 | do | Same as above | H | H | —N(pyrrolidine) | | + |
| 43/23 | do | do | H | H | —N(piperidine) | | + |

3,594,478

TABLE I.—Continued

| A | R | R¹ | R² | —NR³R⁴ | Analgetic effect, p.o. | Antitussive effect, i.v. |
|---|---|---|---|---|---|---|
| 43/24 | do | do | H | H | —N⟨⟩ (hexamethyleneimino) | | + + |
| 41/90 | do | —⟨⟩—OC₂H₅ | H | H | —N(C₂H₅)(C₂H₅) | + + + | + + |
| 53/83 | do | Same as above | H | H | —N⟨⟩ (pyrrolidino) | + + | + + |
| 41/89 | do | do | H | H | —N⟨⟩ (piperidino) | + | + + |
| 53/84 | do | do | H | H | —N⟨O⟩ (morpholino) | | + + + |
| 63/24 | do | do | 5-CH₃ | H | —N(C₂H₅)(C₂H₅) | + + + | + + |
| 63/23 | do | do | Same as above | H | —N⟨⟩ | + + + | + + |
| 63/25 | do | do | do | H | —N⟨⟩ | + + | + + |
| 57/40 | do | —⟨⟩ | H | 6-CH₃ | —N⟨⟩ | | + + |
| 67/23 | do | —⟨⟩—OC₂H₅ | 5-CH₃ | Same as above | Same as above | + + + | + + + |
| 63/35 | do | Same as above | 5-OCH₃ | H | do | | + + + |
| 63/36 | do | do | Same as above | H | —N⟨O⟩ | | + |
| d-Propoxyphene. HCl | | | | | | + + + + + + |
| Codein phosphate | | | | | | + + + + + + |

TABLE II.—SPASMOLYTIC EFFECT AND TOXICITY

| | | | | | | | Toxicity LD₅₀ bodyweight | |
|---|---|---|---|---|---|---|---|---|
| A | R | R¹ | R² | —NR³R⁴ | Spasmolytic effect | | p.o. | i.p. |
| Code Number: | | | | | | | | |
| 53/84 | —CH₂—CH₂— | —⟨⟩—OC₂H₅ | H | H | —N⟨ | 0.7 x papaverine | >1,600 | 680 |
| 67/23 | —CH₂—CH₂— | Same as above | 5-CH₃ | 6-CH₃ | Same | | 500 | 130 |
| d-Propoxyphene. HCl | | | | | | | 240 | 100 |
| Codein phosphate | | | | | | >0.03 x diphenhydramine | 750 | 140 |
| Papaverine | | | | | | 0.7 diphenhydramine | | |

We claim:
1. A pharmaceutical composition comprising as an active ingredient an effective amount of a benzothiophene derivative represented by the formula

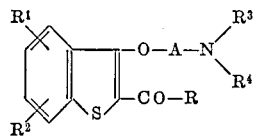

wherein R is a radical selected from the group consisting of alkyl with from one to five carbon atoms, phenyl, phenyl substituted by alkyl having from one to four carbon atoms, phenyl substituted by alkoxy with from one to four carbon atoms, fluorine substituted phenyl, chlorine substituted phenyl, and bromine substituted phenyl; R¹ is a radical selected from the group consisting of hydrogen, alkyl having from one to five carbon atoms, alkoxy having from one to four carbon atoms, fluorine, chlorine and bromine; R² is a radical selected from the group consisting of hydrogen, alkyl having from one to five carbon atoms, alkoxy having from one to four carbon atoms, fluorine, chlorine and bromine; —NR³R⁴ is a radical selected from the group consisting of dialkylamino with from one to five carbon atoms in each alkyl group, pyrrolidino, piperidino, hexamethyleneimino, morpholino, lower dialkylmorpholino, and tetrahydropyridino; and A represents an alkylene radical containing not more than four carbon atoms; and a pharmaceutically acceptable salt thereof, in association with a pharmaceutically acceptable carrier.

2. A pharmaceutical composition according to claim 1 in which the radical R in said active ingredient is alkyl with from 1 to 5 carbon atoms and a pharmaceutically acceptable salt thereof.

3. A pharmaceutical composition according to claim 2 in which the radical R in said active ingredient is tertiary butyl.

4. A pharmaceutical composition according to claim 2 in which the radical R in said active ingredient is methyl.

5. A pharmaceutical composition according to claim 1 wherein the radical R in said active ingredient is selected from the group consisting of phenyl, phenyl substituted by alkyl having from one to our carbon atoms, phenyl substituted by alkoxy with from one to four carbon atoms, fluorine substituted phenyl, chlorine substituted phenyl, and bromine substituted phenyl.

6. A pharmaceutical composition as described in claim 1 wherein the radicals R, $R^1$ and $R^2$ in said active ingredient are as defined in claim 1 and the radical —$NR^3R^4$ is a radical selected from the group consisting of dialkylamino with from one to five carbon atoms in each alkyl group, pyrrolidino, piperidino, morpholino and tetrahydropyridino, and a pharmaceutically acceptable salt thereof.

7. A pharmaceutical composition according to claim 1 wherein the radical $R^1$ in said active ingredient is selected from the class consisting of hydrogen, chlorine, methyl and methoxy, $R^2$ is selected from the group consisting of hydrogen, chlorine, methyl and methoxy, and —$NR^3R^4$ is a radical selected from the group consisting of pyrrolidino, morpholino and diethylamino, and a pharmaceutically acceptable salt thereof.

8. A pharmaceutical composition according to claim 1 wherein the said active ingredient is the benzothiophene derivative of the formula:

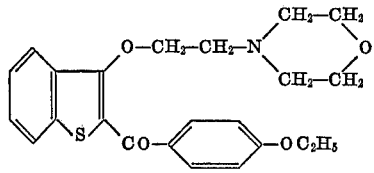

and a pharmaceutically acceptable salt thereof.

9. A pharmaceutical composition according to claim 1 wherein the said active ingredient is the benzothiophene derivative of the formula:

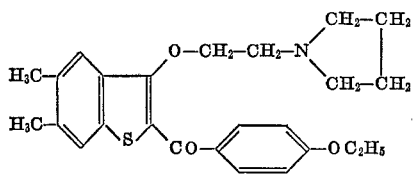

and a pharmaceutically acceptable salt thereof.

10. A pharmaceutical composition according to claim 1 wherein the said active ingredient is the benzothiophene derivative of the formula:

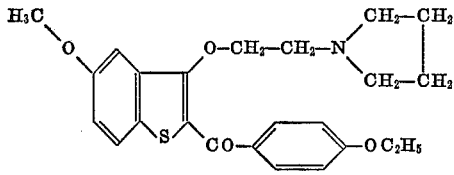

and a pharmaceutically acceptable salt thereof.

11. A pharmaceutical composition according to claim 1 wherein the said active ingredient is the benzothiophene derivative of the formula:

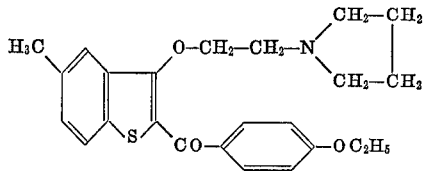

and a pharmaceutically acceptable salt thereof.

12. A pharmaceutical composition according to claim 1 wherein the said active ingredient is the benzothiophene derivative of the formula:

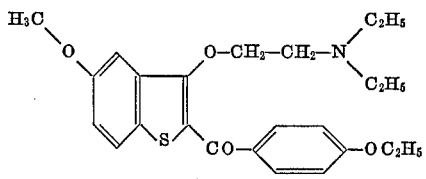

and a pharmaceutically acceptable salt thereof.

13. A pharmaceutical composition according to claim 2 in which in said active ingredient the radical R is tertiary butyl, the radical A is —$CH_2$—$CH_2$—, radicals $R^1$ and $R^2$ are hydrogen and the radical —$NR^3R^4$ is pyrrolidino.

14. A pharmaceutical composition according to claim 2 in which in said active ingredient the radical R is methyl and the radical A is —$CH_2$—$CH_2$—, radicals $R^1$ and $R^2$ are hydrogen and the radical —$NR^3R^4$ is morpholino.

15. A method for alleviating tussive conditions which comprises administering to a patient suffering from such condition a pharmaceutical acceptable amount of a composition described in claim 1.

16. A method for alleviating pain which comprises administering to a patient suffering therefrom an analgesic amount of a composition as described in claim 1.

References Cited

UNITED STATES PATENTS 3,394,125  7/1968  Crenshaw _____ 260—326.5

STANLEY J. FRIEDMAN, Primary Examiner

U.S. Cl. X.R.

260—247.1, 293.4, 294.8, 326.5, 330.5; 424—244, 267, 274, 275,

PO-1050
(5/69)

UNITED STATES PATENT OFFICE
CERTIFICATE OF CORRECTION

Patent No. 3,594,478  Dated July 20, 1971

Inventor(s) Arne Elof Brandstrom, et al

It is certified that error appears in the above-identified patent and that said Letters Patent are hereby corrected as shown below:

Col. 5, line 5, "-ethoxyacetophene" should be
-- -ethoxyacetophenone --;

Col. 6, Table at lines 3 through 19 inclusive, the last 5 lines should be replaced by the following 4 lines:

| | | | |
|---|---|---|---|
| 4'-OC$_2$H$_5$.... | (5-CH$_3$ | 6-CH$_3$ | 177 |
| | (5-Cl | H | 154 |
| | (7-Cl | H | 134 |
| | (5-OCH$_3$ | H | 150 |

Col. 7, lines 30 and 31, "of 2-p-ethoxybenzoyl)" should be -- of 2-(p-ethoxybenzoyl) --;

Col. 7, line 44, "of 2-p-ethoxybenzoyl) should be be -- of 2-(p-ethoxybenzoyl) --;

Col. 7, Example 11, "CH$_2$·CH$_2$-" should be --  -CH$_2$·CH$_2$-  --;

Col. 11, line 68, "of (p-ethoxybenzoyl)" should be -- of 2-(p-ethoxybenzoyl) --;

Col. 11, line 67, "-3-β-pyrrolidinoethoxy)" should be --  -3-(β-pyrrolidinoethoxy)  --;

Col. 14, line 13, "BaCl$_2$=induced" should be -- BaCl$_2$-induced --;

Col. 14, line 15, "diphenhydramine=HCl" should be -- diphenhydramine-HCl --;

Col. 14, Code No. 43/59, under Anti-tussive effect, i.f., "++" should be -- +++ --;

Col. 17, line 2, "our" should be -- four --.

Signed and sealed this 11th day of April 1972.

(SEAL)
Attest:

EDWARD M. FLETCHER, JR.
Attesting Officer

ROBERT GOTTSCHALK
Commissioner of Patents